Aug. 20, 1968 R. R. SCOBEE 3,397,540
HYBRID ROCKET MOTOR HAVING TURBULATOR-MIXER APPARATUS
Filed Dec. 12, 1966
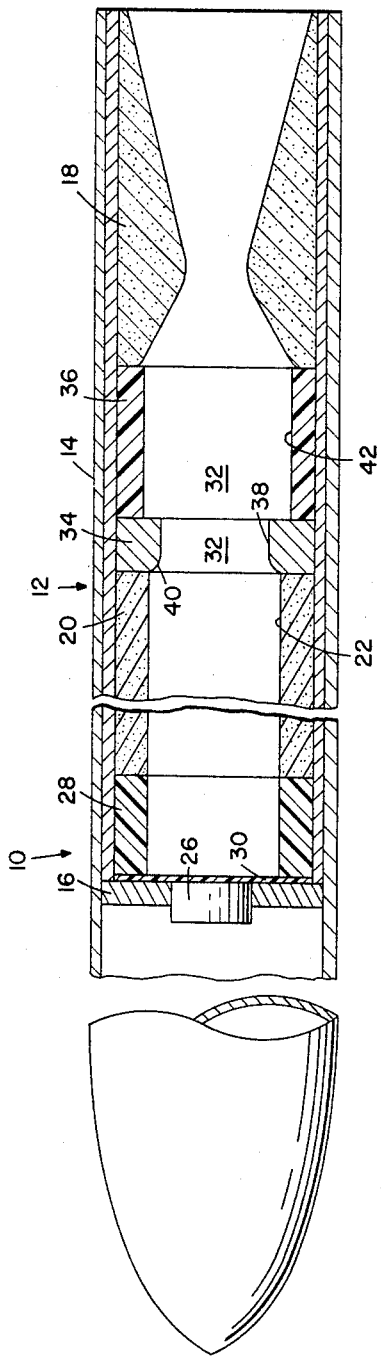
Robert R. Scobee,
INVENTOR.
BY Harry M. Saragovitz
Edward J. Kelly
Herbert Berl
J. Keith Fowler

United States Patent Office 3,397,540
Patented Aug. 20, 1968

3,397,540
HYBRID ROCKET MOTOR HAVING TURBU-
LATOR-MIXER APPARATUS
Robert R. Scobee, Redlands, Calif., assignor, by mesne
assignments, to the United States of America as represented by the Secretary of the Army
Filed Dec. 12, 1966, Ser. No. 602,452
1 Claim. (Cl. 60—251)

ABSTRACT OF THE DISCLOSURE

A hybrid reaction motor having a turbulator-mixer apparatus interposed intermediate the aft end of the solid propellant grain and the exhaust nozzle. The turbulator-mixer apparatus includes a turbulator-mixer ring having a restricted central orifice formed therein for acting on the gas streamlines so as to improve the effective mixing and reacting of the gas stream species prior to entry into the thrust nozzle, thereby raising the combustion efficiency of the motor. The apparatus further includes a turbulator-mixer liner disposed immediately between the mouth of the exhaust nozzle and the aft end of the mixer ring.

This invention relates to hybrid type reaction propulsion motors and more particularly to a head end injection type reaction motor provided with a turbulator-mixer apparatus for aiding the mixing and reacting of the gas stream species within the motor prior to entry into the thrust nozzle, thereby raising the combustion efficiency of the motor.

For effecting combustion in a conventional hybrid motor, a liquid usually the oxidizer—although in a reversed hybrid, it is the fuel) is injected into the axial bore of a solid propellant grain. In order to obtain maximum combustion efficiency, the flow characterictics of the liquid, e.g., mass rate velocity, boundary layer thickness, turbulence, droplet size and distribution within the free gas stream and along the burning surface of the grain bore, must be maintained within narrow limits. It has been found that the combustion reactants, in a head end injection type hybrid motor, tend to stratify into an oxidizer rich core and a fuel rich cylinder surrounding the core. A requirement exists, therefore, to provide means for increasing the effectiveness of the mixing and reacting of the stream species in order to minimize such stratification within the grain bore. Since the combustion efficiency drops rapidly to a premature flameout when the oxidizer spray pattern is disrupted or misdirected, it is also desirable, while aiding the mixing and reacting process, to maintain a near constant spray pattern relative to the solid propellant grain bore under all operating conditions. If a rocket, and thus the combustion chamber thereof, is subjected to lateral accelerations, the free oxidizer stream tends to drift in the direction opposite to the acceleration, thus, leaving portions of the grain bore out of the area of coverage of the injected oxidizer and also impairing the flow characteristics of the injected oxidizer.

Apparatus of the present invention includes the provision, in a hybrid motor, of a turbulator-mixer apparatus disposed in the motor chamber for causing an acceleration of the gas flow and a change of direction of the streamlines (with the exception of the centerline) to maintain desired flow characteristics of the injected oxidizer and to assure substantially even distribution of the oxidizer over the entire propellant burning surface while yielding a high degree of mixing and reacting of the stream species.

Accordingly, an object of the present invention is to provide, in a hybrid motor, apparatus to aid mixing and reacting of the stream species.

Another object of the present invention is to provide, in a head end injection type hybrid motor, apparatus and method for greatly increasing the combustion efficiency of the motor.

A further object of the present invention is to provide, in a head end injection type hybrid motor, apparatus for reducing to a very minimum stratification of the combustion reactants within the propellant grain bore.

A still further object of the present invention is to provide, in a hybrid motor, apparatus which will assure substantially equal distribution of the injected oxidizer over the entire burning surface of the propellant grain even when the rocket is subjected to lateral accelerations.

An important feature of the present invention resides in the provision of a tubulator-mixer apparatus which is economical, relatively simple to manufacture, and which may be inserted as an assembly within existing hybrid motors.

Other objects, features and attendant advantages of the present invention will be readily apparent as the same becomes better understood by reference to the following detailed description taken in conjunction with the accompanying drawing, in which:

The single figure is a longitudinal, cross-sectional view of a head end injection type hybrid motor embodying a turbulator-mixer apparatus according to the present invention.

Referring to the drawing, reference numeral 10 generally designates the body of a missile or the like vehicle (partially shown) carrying within its aft end a reaction propulsion unit or hybrid rocket motor 12. Motor 12 is a head end injection type motor having an elongated, cylindrical casing 14. Conventionally, casing 14 is closed at its upstream or fore end by a head end plate 16 and terminates on its downstream or aft end by a convergent-divergent thrust nozzle 18. An elongated solid propellant grain 20 is disposed within the casing concentrically about the longitudinal axis of the casing. The propellant grain is formed with an enlarged bore or axially extending passageway 22, which defines the combustion chamber. Liquid oxidizer is injected into the bore by an injector means 26 mounted coaxially within the head end plate. Injector means 26 may be of any conventional stationary type or of a self-compensating, movable type, e.g., that disclosed in U.S. Patent 3,260,047. To protect the injector means, an annular insulator ring 28 is disposed within the fore end of the casing, and an ablative shield 30 is provided across the interior wall of the head end plate. It is preferable that insulator ring 28 have an inside diameter equal to that of the axial passageway or bore of the propellant grain so as to provide a smooth continuation thereof.

It is to be understood that while the hybrid motor of the present invention is shown to have a solid propellant grain and a liquid oxidizer, such is for illustrative purposes only, and, if desirable, the oxidizer may be of solid composition and the fuel may be liquid. In any event, the use of either alternative is encompassed by the inventive concept of the present invention.

The hybrid motor construction of the present invention is such as to eliminate, or reduce to a very minimum, stratifying of the combustion reactants into an oxidizer rich core and a fuel rich cylinder surrounding the core. Thus, the apparatus of the present invention provides means for increasing the effective mixing and reacting of the stream species, thereby raising the combustion efficiency of the motor.

To this end, space is provided between the aft end of the propellant grain and the upstream end or mouth of the exhaust nozzle, this space defining a turbulator-mixer chamber 32. A turbulator-mixer ring 34 and an annular turbulator-mixer liner 36 are disposed in chamber 32. Turbulator-mixer ring 34 has an axial passage 38 of restricted diameter and the passage is formed with a convergent mouth or entrance 40 merging with the axial bore of the propellant grain. Liner 36 is formed with an axial passageway 42 of such diameter as to merge smoothly with the mouth or entrance of the exhaust nozzle.

In operation, the oxidizer is supplied, under pressure, to injector means 26 for injection into propellant bore 22 for substantially equal distribution across propellant grain 20. The turbulator-mixer ring, on its entrance side, causes an acceleration of the gas flow and a change of direction of the streamlines (except the centerline). Any solid or liquid particles in the gas stream tend to cross streamlines and to be accelerated by the gas stream, thus, causing mixing of the species. A toroidal or ring vortex is generated on the downstream side of the turbulator-mixer ring, i.e., within the axial passage of the turbulator-mixer liner, thus, causing further mixing and reacting of the stream species. Accordingly, the turbulator-mixer apparatus provides improved, turbulent mixing and reacting of the stream species passing from the combustion chamber prior to entry into the exhaust nozzle with the end result that the combustion reactants are prevented from stratifying and that the combusion efficiency is raised to a very high value.

In addition to the above functions, the turbulator-mixer apparatus of the present invention is so arranged as to maintain desirable flow characteristics of the injected liquid in a spray pattern approaching ideal even when the propelled vehicle is subjected to lateral accelerations.

While the turbulator-mixer apparatus has been described herein in conjunction with hybrid rocket motors, it is to be understood that the principle of the invention may be extended to be included in other reaction propulsion motors and in many control devices utilizing fluid jetstreams wherein a high degree of mixing and reacting is desired.

It should be apparent that the dimensions of the turbulator-mixer ring and liner, as well as the size of the restriction in the ring, may be varied in accordance with the dimensions of the combustion chamber and nozzle and with the particular design criteria. Moreover, the propellant grain bore may be of any known cross-sectional shape, e.g., star-shape, wagon-wheel shape, etc. In addition, the surface of the restricted bore of the turbulator-mixer ring may be provided with diverters or baffles.

Obviously, many modifications and variations of the present invention are possible in the light of the above teachings. It is, therefore, to be understood that within the scope of the appended claim, the invention may be practiced otherwise than as specifically described.

What is claimed is:

1. In a hybrid rocket motor including a case, a head end plate closing the fore end of said case, an elongated solid propellant grain disposed within said case and provided with an axial passageway, injection means mounted in said head end plate and disposed for injecting oxidizer into said passageway, and a thrust nozzle on the aft end of said case, the improvement wherein a turbulator-mixer chamber is provided within said case intermediate the aft end of said propellant grain and the mouth of said nozzle and wherein a turbulator-mixer assembly is disposed within said chamber for acting on the gas stream species within said chamber prior to entry into the thrust nozzle, thereby raising the combustion efficiency of the hybrid motor, said turbulator-mixer assembly including: a turbulator-mixer ring having its fore end in abutting engagement with the aft end of said propellant grain and having its opposite end spaced from the mouth of said nozzle, said ring having a restricted orifice formed therein for causing an acceleration of the gas flow and a change of direction of the streamlines passing therethrough; and, an annular turbulator-mixer liner positioned within said chamber in the space between the ring and the mouth of the thrust nozzle, said liner having an axial passageway extending therethrough, the structure wherein the passageway formed in the propellant grain is of a first diameter, the passageway formed by the orifice of the mixer ring is of a second diameter, and the passageway formed by the liner is of a third diameter, said second diameter being smaller than said first diameter and said third diameter being larger than said first diameter but substantially equal to that of the mouth of said nozzle.

References Cited
UNITED STATES PATENTS 2,990,682    7/1961    Mullaney _____ 60—251
3,315,472    4/1967    Moutet et al. _____ 60—251

CARLTON R. CROYLE, *Primary Examiner.*